(12) United States Patent
Zhang et al.

(10) Patent No.: US 9,952,707 B2
(45) Date of Patent: Apr. 24, 2018

(54) PASSWORD INPUT DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Jiannan Zhang, Beijing (CN); Jianfeng Yuan, Beijing (CN); Seung Moo Rim, Beijing (CN)

(73) Assignees: BOE Technology Group Co., Ltd., Beijing (CN); Beijing BOE Display Technology Co., Ltd., Beijing (CN)

( * ) Notice: Subject to any disclaimer, the term of this patent is extended or adjusted under 35 U.S.C. 154(b) by 86 days.

(21) Appl. No.: 14/427,252

(22) PCT Filed: Apr. 22, 2014

(86) PCT No.: PCT/CN2014/075956
§ 371 (c)(1),
(2) Date: Mar. 10, 2015

(87) PCT Pub. No.: WO2015/109673
PCT Pub. Date: Jul. 30, 2015

(65) Prior Publication Data
US 2016/0026319 A1    Jan. 28, 2016

(30) Foreign Application Priority Data

Jan. 22, 2014    (CN) .......................... 2014 1 0030868

(51) Int. Cl.
*G06F 3/041*    (2006.01)
*G06F 21/36*    (2013.01)
(Continued)

(52) U.S. Cl.
CPC ............ *G06F 3/0416* (2013.01); *G06F 3/044* (2013.01); *G06F 3/0412* (2013.01); *G06F 3/0488* (2013.01); *G06F 21/36* (2013.01)

(58) Field of Classification Search
None
See application file for complete search history.

(56) References Cited

U.S. PATENT DOCUMENTS

2010/0175016 A1*  7/2010  Tian .................... G06F 3/04886
                                                            715/773
2011/0119623 A1*  5/2011  Kim ...................... G06F 3/0237
                                                            715/808

(Continued)

FOREIGN PATENT DOCUMENTS

CN         2757224 Y      2/2006
CN       101340479 A      1/2009
(Continued)

OTHER PUBLICATIONS

Feb. 5, 2016—(CN)—First Office Action Appn 201410030868.6 with English Tran.

(Continued)

*Primary Examiner* — Joseph Haley
*Assistant Examiner* — Emily Frank
(74) *Attorney, Agent, or Firm* — Banner & Witcoff, Ltd.

(57) ABSTRACT

A password input device includes: at least two mutually separate touch display screens; a controller configured to control the touch display screen to randomly display characters; and a processor configured to determine the characters currently displayed on corresponding touch display screens subjected to a touch operation after detecting the touch operation, determine a character string inputted by a user according to a sequence of the touch operation, and take the character string as a password inputted by the user. The password input device can adopt a flexible overall arrange- (Continued)

ment mode of the character string for the password and improve the security of password input. A password input method is further disclosed.

13 Claims, 4 Drawing Sheets (51) Int. Cl.
*G06F 3/044* (2006.01)
*G06F 3/0488* (2013.01)

(56) References Cited

U.S. PATENT DOCUMENTS

| 2013/0047238 | A1* | 2/2013 | Hwang | H04L 9/3228 726/7 |
| 2013/0328801 | A1* | 12/2013 | Quigley | G06Q 20/3674 345/173 |
| 2014/0043243 | A1* | 2/2014 | Methenitis | G06F 21/31 345/173 |
| 2014/0366127 | A1* | 12/2014 | DeLuca | G06F 21/36 726/19 |
| 2015/0205406 | A1* | 7/2015 | Zhou | G06F 3/0412 345/174 |
| 2015/0234629 | A1* | 8/2015 | Park | G06F 3/1423 455/566 |
| 2016/0004854 | A1* | 1/2016 | Kowaka | G06F 21/36 726/6 |

FOREIGN PATENT DOCUMENTS

| CN | 101465017 A | 6/2009 |
| CN | 101510331 A | 8/2009 |
| CN | 102857615 A | 1/2013 |
| WO | 2012124898 A2 | 9/2012 |

OTHER PUBLICATIONS

May 20, 2016—(CN)—Second Office Action Appn 201410030868.6 with English Tran.
Oct. 15, 2014—(CN) International Search Report—App PCT/CN2014/075956.
International Search Report and Written Opinion dated Oct. 15, 2014 (PCT/CN2014/075956); ISA/CN.
Sep. 14, 2016—(CN)—Third Office Action Appn 201410030868.6 with English Tran.

* cited by examiner

PASSWORD INPUT DEVICE

The application is a U.S. National Phase Entry of International Application No. PCT/CN2014/075956 filed on Apr. 22, 2014, designating the United States of America and claiming priority to Chinese Patent Application No. 201410030868.6 filed on Jan. 22, 2014. The present application claims priority to and the benefit of the above-identified applications and the above-identified applications are incorporated by reference herein in their entirety.

TECHNICAL FIELD

The embodiments of the present invention relate to a password input device.

BACKGROUND

For instance, as for point of sale (POS) machines and automated teller machines (ATMs) widely applied in the banking system and the business system, users can receive required service after entering a password or passwords.

A traditional password input device generally employs mechanical keys as function keys. By adoption of the mechanical keys as the function keys, the character specified on each function key for password is unchangeable, and hence the arrangement mode of the characters is unchangeable. Thus, observers not having a password can easily analyze the password entered by a password inputter according to the gesture of the password inputter for operating corresponding function keys. Therefore, the password input device has large security risk if the characters on the function keys for password are arranged in an unchanged arrangement mode.

SUMMARY

At least one embodiment of the present invention provides a password input device, which can change the arrangement mode of characters for function keys and hence improve the security of password input.

At least an embodiment of the present invention provides a password input device comprising: at least two mutually separate touch display screens; a controller configured to control each of the touch display screens to randomly display a character; and a processor configured to determine characters currently displayed on corresponding touch display screens subjected to a touch operation after detecting the touch operation, determine a character string inputted by a user, and take the character string as a password inputted by the user.

The password input device in one of embodiments of the present invention comprises at least two mutually separate touch display screens, and a controller is configured to control each of the touch display screens to randomly display a character; in this way, the arrangement of the characters for password can be flexible, and the security for inputting a password can be improved.

For example, in some embodiments of the present invention, the touch display screens each comprise a sensor capable of sensing the touch operation; the touch operation is sensed by the sensor thus no complicated process for scanning and positioning is needed, and the whole becomes easy.

For example, in some embodiments of the present invention, the touch display screens comprise a capacitive touch display screen, a resistive touch display screen or an inductive touch display screen, thus the established touch display screens can be applied and the process become simple.

For example, in some embodiments of the present invention, the touch display screens comprise a twisted nematic liquid crystal display so as to prevent an observer not inputting a password from peeping into the characters displayed on the touch display screens.

For example, the controller is further configured to control the touch display screens to display a function character and/or a command character; and the processor is configured to detect the touch operation and execute corresponding function when determining that the characters currently displayed on the corresponding touch display screen subjected to touch operation comprise a function character, and to detect the touch operation and execute corresponding command when determining that the characters currently displayed on the corresponding touch display screen subjected to touch operation comprise a command character.

For example, the number of the touch display screens is 12; and for example, the controller is configured to control the touch display screens to randomly display digit characters, "Confirm" or "Cancel", and the digit characters are 0 to 9.

For example, the controller is configured to control the touch display screens to randomly display characters when receiving a start command to save power, and allow the characters displayed on the touch display screens to be different from the characters displayed when receiving the start command the last time, and thus the security can be further improved.

For example, the processor is configured to send a notification message to the controller after detecting the touch operation; and the controller is further configured to update the characters displayed on the touch display screens after receiving the notification message.

In some embodiments of the present invention, each time when the processor detect the touch operation, the controller updates the characters displayed on the touch display screens, and thus the security can be improved further.

For example, the processor may be further configured to send a confirm command for finishing a password input process to the controller when detecting the touch operation and determining that the characters currently displayed on the corresponding touch display screen subjected to touch operation comprises a confirm character for finishing the password input process; and the controller is further configured to update the characters displayed on the touch display screens after receiving the confirm command.

In some embodiments, the controller may be configured to update the characters displayed on the touch display screens after the person inputting a password finishes inputting the password, and user operation becomes more convenient while the security can be improved.

The controller may be further configured to periodically update the characters displayed on the touch display screens according to a preset duration, and thus the security can be further improved.

Another embodiment of the present invention provides a password input method, comprising: starting a password input device; allowing a controller to control random display of characters on touch display screens corresponding to function keys respectively; and allowing a processor to determine characters currently displayed on corresponding touch display screens subjected to a touch operation after detecting that the touch display screens are subjected to the touch operation, determine a character string inputted by a user according to a sequence of the touch operation, and take the character string as a password inputted by the user.

BRIEF DESCRIPTION OF THE DRAWINGS

Simple description will be given below to the accompanying drawings of the embodiments to provide a more clear understanding of the technical proposals of the embodiments of the present invention. It will be obvious to those skilled in the art that the drawings described below only involve some embodiments of the present invention but are not intended to limit the present invention.

DETAILED DESCRIPTION

Clear and complete description will be given below to the technical proposals of the embodiments of the present invention with reference to the accompanying drawings of the embodiments of the present invention. It will be obvious to those skilled in the art that the preferred embodiments are only partial embodiments of the present invention but not all the embodiments. All the other embodiments obtained by those skilled in the art without creative efforts on the basis of the embodiments of the present invention illustrated shall fall within the scope of protection of the present invention.

Figure 1:
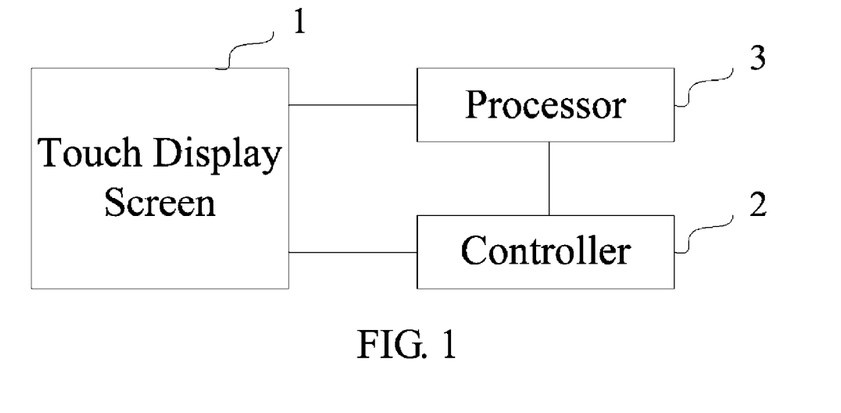
FIG. 1 is a schematic structural diagram of a password input device provided by an embodiment of the present invention.

At least one embodiment of the present invention provides a password input device. The configuration of the password input device is as shown in FIG. 1. The password input device comprises at least two mutually separate touch display screens 1 and further comprises a controller 2 and a processor 3.

For instance, the touch display screens 1 are configured to display different characters, icons and the like and hence are employed as function keys of the password input device. The controller 2 is configured to control the touch display screens 1 to randomly display characters respectively. The processor 3 is configured to determine the characters currently displayed on corresponding touch display screens 1 for a touch operation after having detected the touch operation, determine a character string inputted by the user according to the sequence of the touch operation, and take the determined character string as a password inputted by the user. The character string, for instance, may be further encrypted and hence stored into the system. The encryption operation is, for instance, hash calculation.

For instance, in some embodiments of the present invention, the controller 2 is further configured to control the touch display screens 1 to display a function character and/or a command character; and the processor 3 is, for instance, configured to: detect the touch operation, and execute a corresponding function when determining that the character currently displayed on the corresponding touch display screen subjected to the touch operation is a function character; or detect the touch operation, and execute a corresponding command when determining that the character currently displayed on the corresponding touch display screen subjected to the touch operation is a command character.

For instance, in some embodiments of the present invention, the number of the touch display screens can be elected according to actual demands. In the embodiments of the present invention, the characters taken as the password may be ten digits, i.e., "0-9," and may also be alphabetic characters (e.g., alphabets a, b . . . ). Of course, characters and icons such as "*", "Confirm" and/or "Cancel" may also be displayed on the touch display screens 1. In the embodiment of the present invention, the number of the touch display screens 1 may be set according to the number of the characters required to be displayed. For instance, a commonly used password input device on an ATM machine may be provided with 12 function keys which are respectively used for displaying ten digits "0-9", "Confirm" and "Cancel."

Moreover, for instance, in some embodiments of the present invention, the touch display screens 1 are separate from each other, namely the touch display screens are mutually independent in structure and function. In this case, for instance, one touch display screen is equivalent to one mechanical key in a traditional password input device and is independently controlled by the controller 2.

Figure 2:
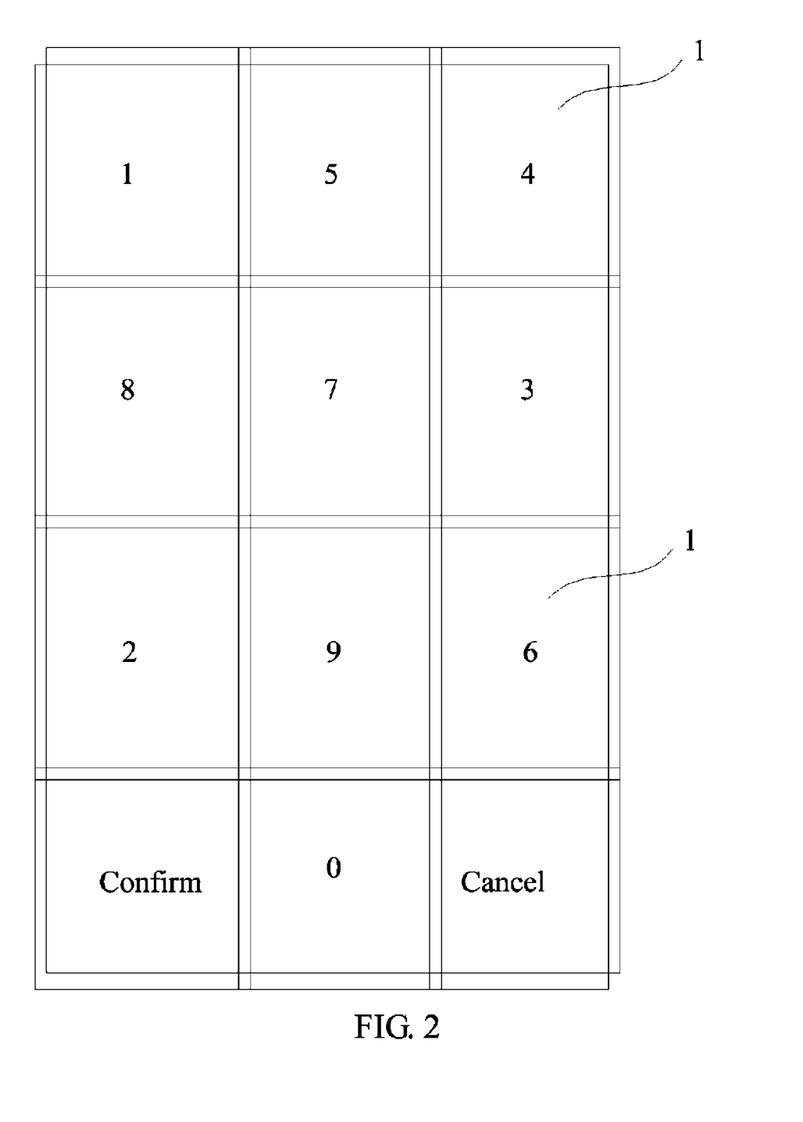
FIG. 2 is another schematic structural view of the password input device provided by an embodiment of the present invention.

Furthermore, for instance, in some embodiments of the present invention, the arrangement mode of the touch display screens 1 may also be flexible. In some embodiments of the present invention, the touch display screens have a specified space therebetween and are arranged in a predetermined arrangement. For instance, when the password input device is provided with 12 touch display screens which are respectively used for displaying ten digits "0-9" and "Confirm" and "Cancel", the arrangement mode of 4 rows and 3 columns may be adopted, as illustrated in FIG. 2. In addition, the touch display screens 1 may have a specified space. Of course, the specified space may be as small as possible so that the touch display screens can make tight contact with each other and are presented as seamless arrangement in appearance. For instance, in the password input device as shown in FIG. 2, the 12 touch display screens are mutually separate touch display screens. The 12 touch display screens 1 are independently controlled by the controller 2 and respectively used for displaying different characters.

Figure 3:
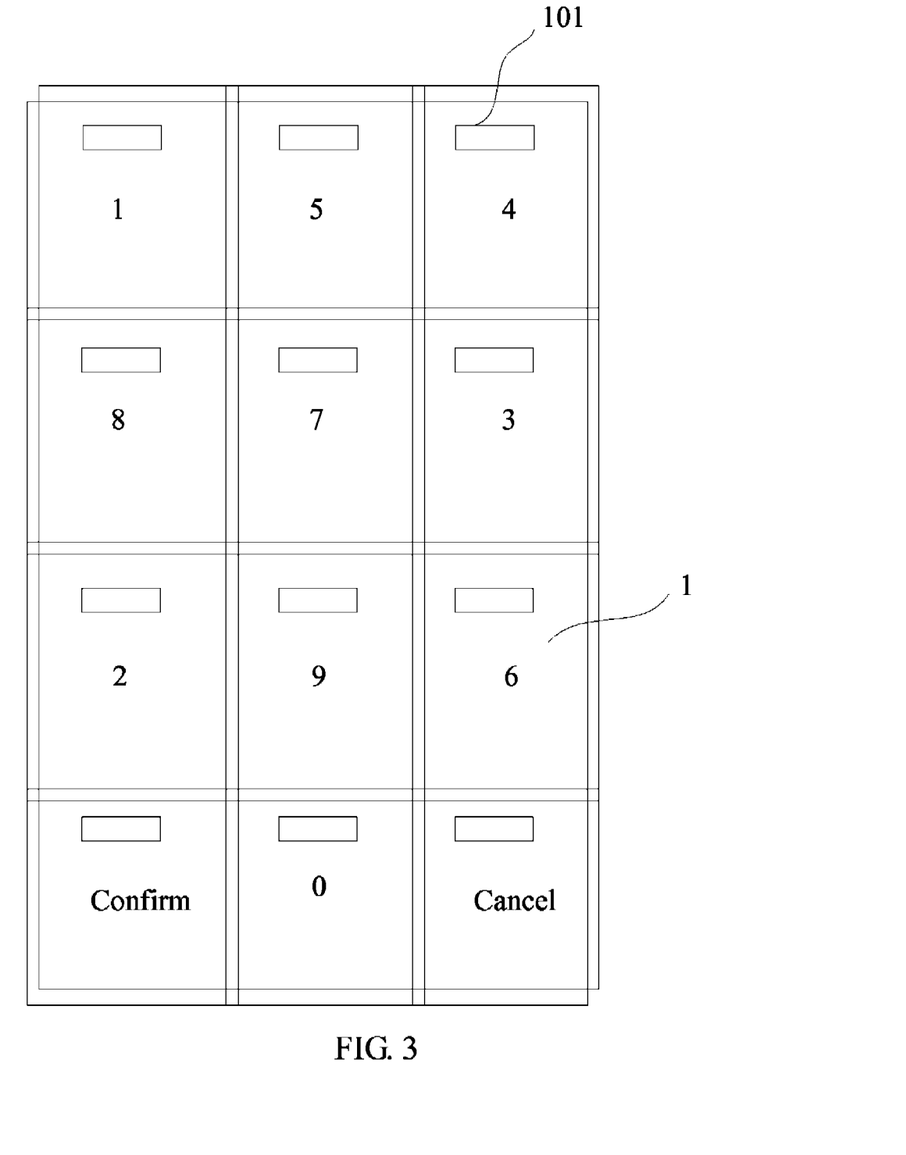
FIG. 3 is still another schematic structural view of the password input device provided by an embodiment of the present invention.

It should be noted that: in some embodiments of the present invention, the touch display screens 1 corresponding to function keys of a touch display device may be normal touch screens which have a display function and can sense the touch operation. For instance, as illustrated in FIG. 3, a sensor 101 capable of sensing the touch operation is disposed on a normal display screen to obtain the touch screen. In some embodiments of the present invention, the sensor 101 may be any type of sensor capable of sensing the touch operation. That is to say, in the embodiment of the present invention, the sensing of the touch operation can be simply achieved by a sensor, without a complicated operation such as touch scanning and positioning.

Preferably, for instance, in some embodiments of the present invention, the touch display screens 1 may be capacitive touch display screens, resistive touch display screens or inductive touch display screens, which is not limited in the present invention.

In one embodiment of the present invention, a touch display screen 1 is, for instance, a twisted nematic (TN) type LCD. The TN-LCD has the characteristic of narrow viewing angle, so that an observer not inputting a password are difficult to peep into the characters displayed on the function keys, and hence the security can be further improved.

The password input device provided by some embodiments of the present invention comprises at least two mutually separate touch display screens. The touch display screens replace the mechanical keys in a traditional password input device. Moreover, the controller is configured to control the touch display screens to randomly display characters respectively. Thus, the arrangement mode of the characters for password can be flexible, and hence the security of password input can be improved.

In some embodiments of the present invention, the controller 2 is configured to control the touch display screens 1 to randomly display characters respectively. The displayed characters may include, but are not limited to, the ten digits "0-9" and the characters such as "Cancel" and "Cancel". The final arrangement mode of the characters displayed on all the touch display screens may be disordered and may also be in a certain order. In the embodiment of the present invention, preferably, the displayed characters are randomly arranged to improve security.

Moreover, in some embodiments of the present invention, the controller 2 may control the touch display screens 1 to randomly display characters when receiving a start command for starting the password input device, and to not display the character when the device is not in operation (e.g., in the standby state), so that the resources can be saved.

Furthermore, in some embodiments of the present invention, the controller 2 may allow the arrangement mode of the characters displayed on the touch display screens, each time when receiving the start command, to be different from the arrangement mode of the characters displayed on the touch display screens the last time when receiving the start command. For instance, when the password inputter is changed each time, the password input device is restarted. In this case, the controller 2 controls the touch display screens 1 to display characters different from the characters displayed the last time, so that the security can be further improved.

In some embodiments of the present invention, the processor 3 may also send a notification message to the controller 2 after detecting a touch operation, and the controller 2 may update the characters displayed on the touch display screens after receiving the notification message sent by the processor 3. Thus, the security can be further improved.

Preferably, in some embodiments of the present invention, the controller 2 may update the characters displayed on all the touch display screens or may only update the characters displayed on a portion of the touch display screens after receiving the notification message sent by the processor 3. The control means may be flexible and is not limited in the present invention.

Preferably, in some embodiments of the present invention, the controller 2 may also update the characters displayed on the touch display screens after the password inputter inputs a set number of characters. For instance, after the user inputs each character for password, the controller may control the touch display screens to display characters for password different from the characters displayed the last time, so as to update the characters displayed on the touch display screens. In some embodiments of the present invention, the number of characters may be set according to the number of characters to be inputted by the password inputter. For instance, when the number of characters required to be inputted by the password inputter is 6, the arrangement mode that the characters for password and displayed on the touch display screens are updated after 3 or 4 characters for password are inputted and even after 6 characters for password are inputted may be adopted, so that more convenient user operation can be achieved.

Preferably, in some embodiments of the present invention, the processor 3 may also be configured to send a confirm command for finishing a password input operation after detecting the touch operation and determining that the character currently displayed on the corresponding touch display screen subjected to the touch operation is a confirm character for finishing password input; and the controller 2 can update the characters displayed on the touch display screens when receiving the confirm command for finishing the password input operation sent by the processor 3. Thus, the characters can be updated in time when the password input device finishes the password input operation each time, and hence the case that the observers not inputting a password remember the password input gesture of the password inputter, view the arrangement mode of the characters for password after the password inputter leaves, and guess the password inputted by the password inputter can be avoided.

Of course, in some embodiments of the present invention, the controller 2 may update the characters displayed on all the touch display screens or may only update the characters displayed on a portion of the touch display screens after receiving the notification message sent by the processor 3. The control means is flexible.

Furthermore, in other embodiments of the present invention, the controller 2 may be also configured to: periodically update the characters displayed on the touch display screens according to a preset duration. Thus, the security can be further improved.

Figure 4:
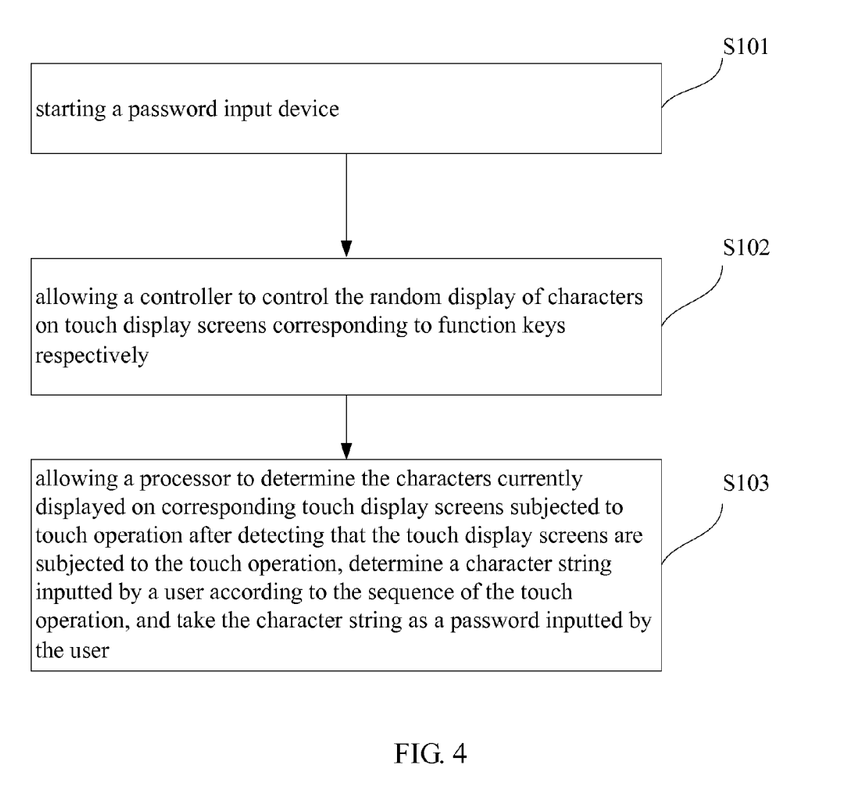
FIG. 4 is a workflow diagram of the password input device provided by an embodiment of the present invention.

On the basis of the password input device provided by the embodiments of the present invention, at least one embodiment of the present invention provides a process for inputting a password, which, as illustrated in FIG. 4, comprises the following steps:

S101: starting the password input device.

In some embodiments of the present invention, in order to start the password input device, a start or power-on function key may be set among the function keys of the password input device, and the password input device is started by inputting a start command through the start function key. Of course, the password input device may also be started by another device connected with the password input device. For instance, in an ATM machine used in the banking system, the password input device is started when identifying that a user inserts a bank card into the ATM machine.

S102: allowing the controller to control the random display of characters on the touch display screens.

In some embodiments of the present invention, the controller may control the random display of the characters on the touch display screens respectively by, for instance, a software program. In the embodiment of the present invention, the character displayed on each touch display screen is just one character. The character, for instance, may be one of ten digits "0-9" and may also be the character "Confirm" or "Cancel."

In some embodiments of the present invention, the controller controls the display of the characters on the touch display screens, and the overall arrangement mode is disordered. Thus, the security can be improved and the case that observers not inputting passwords acquire the characters inputted by the password inputter by analyzing the password input gesture of the password inputter can be avoided.

S103: allowing the processor to determine the characters currently displayed on corresponding touch display screens subjected to the touch operation after detecting that the touch display screens are subjected to the touch operation, determine a character string inputted by a user according to the sequence of the touch operation, and take the character string as a password inputted by the user.

For instance, in some embodiments of the present invention, the touch display screen corresponding to each function key is provided with a sensor capable of sensing the touch operation. Thus, when the touch display screen is subjected to the touch operation, the sensor can sense the touch operation, and the processor detects whether sensor senses the touch operation, determines the touch display screen subjected to the touch operation, take the character currently displayed on the touch display screen subjected to the touch operation as the character required to be inputted, and input the character.

Preferably, in some embodiments of the present invention, the controller may update the characters displayed on the touch display screens when receiving the start command for starting the password input device each time. For instance, as for an ATM machine, when a user inserts a bank card each time, the controller controls the touch display screens to display characters different from the characters displayed the last time, so as to update the arrangement mode of the characters displayed on the touch display screen.

Preferably, in some embodiments of the present invention, the controller may also update the characters displayed on the touch display screens after the password inputter inputs a set number of password characters. For instance, the controller controls the touch display screens to display characters different from the password characters displayed the last time after the user inputs each password character, so as to update the characters displayed on the touch display screens. In some embodiments of the present invention, the number of characters may be elected according to the number of characters to be inputted by the password inputter. For instance, when the number of characters required to be inputted by the password inputter is 6, the controller may update the characters displayed on the touch display screens after inputting 3, 4 or 6 password characters. Thus, more convenient user operation can be achieved.

Preferably, in some embodiments of the present invention, the controller may also periodically update the arrangement mode of the characters displayed on the touch display screens according to the setting duration. Thus, the arrangement mode of the characters displayed on the touch display screens is changed after the password input device is used for a period of time, and hence the security can be improved further.

In some embodiments of the present invention, the controller can control the update of the characters displayed on the touch display screens according to different conditions. Thus, the overall arrangement mode of the characters for password is flexible, and hence the security of password input can be further improved.

Obviously, various modifications and deformations can be made to the present invention by those skilled in the art without departing from the spirit and scope of the present invention. Therefore, if the modifications and deformations of the present invention fall within the scope of the appended claims of the present invention and equivalents thereof, the present invention is also intended to include the modifications and deformations.

The application claims priority to the Chinese patent application No. 201410030868.6 submitted on Jan. 22, 2014. The disclosure content of the Chinese patent application is entirely incorporated herein by reference as part of the application.

The invention claimed is:

1. A password input device, comprising:
   at least two mutually separate touch display screens with respective display surfaces facing in a same side;
   a controller configured to control each of the touch display screens to randomly display a different character, wherein a total number of characters displayed on the separate touch display screens is equal to a total number of the separate touch display screens, and the characters displayed on the separate touch display screens have a one-to-one correspondence with the separate touch display screens; and
   a processor configured to determine characters currently displayed on corresponding touch display screens subjected to a touch operation after detecting the touch operation, determine a character string inputted by a user, and take the character string as a password inputted by the user,
   wherein the controller is also configured to control the touch display screens to randomly display characters in response to receiving a new start command, with the randomly displayed characters being different from characters previously displayed in response to receiving a previous start command, and the new start command is configured to start the password input device from a standby state, and
   wherein the controller is further configured to, prior to completion of input of a total number of characters in the password, update the characters displayed on the touch display screens in response to a set number of characters being inputted by the user, the set number of characters being less than the total number of characters in the password.

2. The password input device according to claim 1, wherein each touch display screen includes a sensor capable of sensing the touch operation.

3. The password input device according to claim 1, wherein the touch display screens comprise a capacitive touch display screen, a resistive touch display screen or an inductive touch display screen.

4. The password input device according to claim 1, wherein the touch display screens comprise a twisted nematic liquid crystal display.

5. The password input device according to claim 1, wherein
   the controller is further configured to control the touch display screens to display a function character and/or a command character; and
   the processor is configured to:
      detect the touch operation and execute a corresponding function when determining that the characters currently displayed on the corresponding touch display screens subjected to touch operation comprise a function character; and
      detect the touch operation and execute a corresponding command when determining that the characters currently displayed on the corresponding touch display screens subjected to touch operation comprise a command character.

6. The password input device according to claim 5, wherein
   a number of the touch display screens is 12; and the controller is configured to control the touch display screens to randomly display digit characters, "Confirm" or "Cancel", and the digit characters are 0 to 9.

7. The password input device according to claim 5, wherein the processor is configured to send a notification message to the controller after detecting the touch operation; and the controller is further configured to update the characters displayed on the touch display screens after receiving the notification message.

8. The password input device according to claim 5, wherein the processor is further configured to send a confirm command for finishing a password input process to the controller when detecting the touch operation and determining that the characters currently displayed on the corresponding touch display screen subjected to the touch operation comprises a confirm character for finishing the password input process; and the controller is further configured to update the characters displayed on the touch display screens after receiving the confirm command.

9. The password input device according to claim 5, wherein the controller is further configured to periodically update the characters displayed on the touch display screens according to a preset duration.

10. The password input device according to claim 1, wherein the processor is configured to send a notification message to the controller after detecting the touch operation; and the controller is further configured to update the characters displayed on the touch display screens after receiving the notification message.

11. The password input device according to claim 1, wherein the processor is further configured to send a confirm command for finishing a password input process to the controller when detecting the touch operation and determining that the characters currently displayed on the corresponding touch display screen subjected to the touch operation comprises a confirm character for finishing the password input process; and the controller is further configured to update the characters displayed on the touch display screens after receiving the confirm command.

12. The password input device according to claim 1, wherein the controller is further configured to periodically update the characters displayed on the touch display screens according to a preset duration.

13. A password input method, comprising:

receiving a new start command for starting a password input device;

starting the password input device from a standby state;

allowing a controller to control random display of characters which are different from characters displayed in response to receiving a previous start command on at least two mutually separate touch display screens with respective display surfaces facing in a same side corresponding to function keys respectively;

allowing a processor to determine characters currently displayed on corresponding touch display screens subjected to a touch operation after detecting that the touch display screens are subjected to the touch operation;

prior to completion of input of a total number of characters in a password, updating the characters displayed on the touch display screens in response to a set number of characters being inputted by a user, the set number of characters being less than the total number of characters in the password; and determining a character string inputted by the user according to a sequence of the touch operation, and taking the character string as the password inputted by the user, wherein the random display of characters comprises random display of a different character on each of the separate touch display screens, wherein a total number of characters displayed on the separate touch display screens is equal to a total number of the separate touch display screens, and the characters displayed on separate the touch display screens have a one-to-one correspondence with the separate touch display screens.

* * * * *